United States Patent Office 3,452,895
Patented July 1, 1969

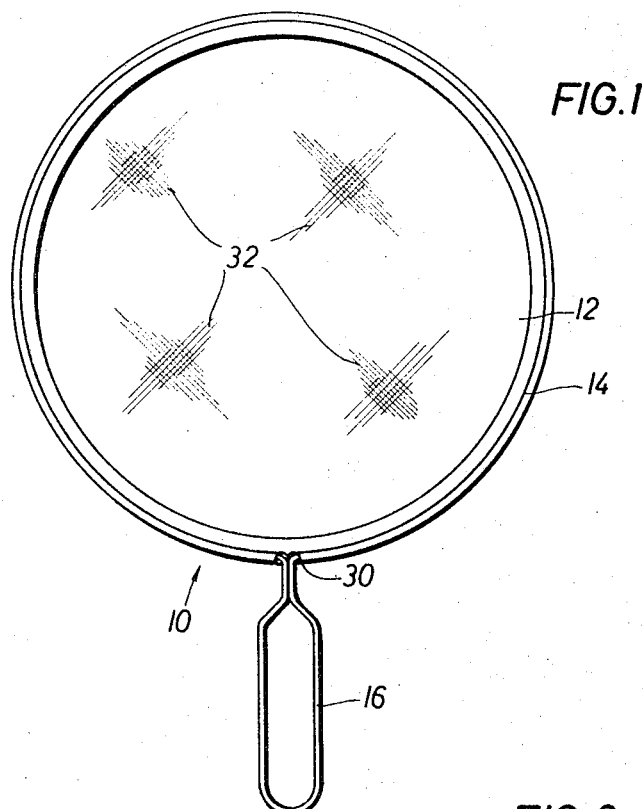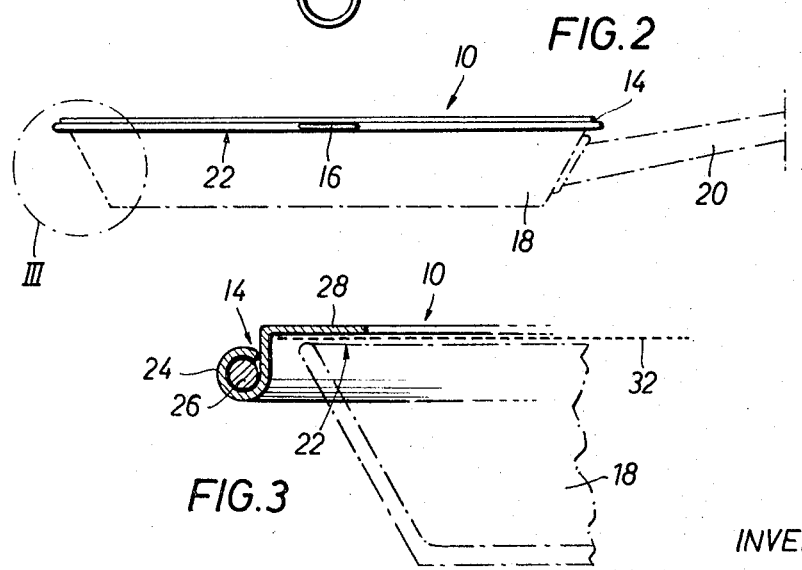

3,452,895
UTENSIL FOR PREVENTING SPRAYING WITH FRYING PANS, COOKING POTS OR THE LIKE
Kurt U. Kalkowski, 7 Ulmenallee, Surth, Germany
Filed Feb. 16, 1968, Ser. No. 706,007
Claims priority, application Germany, Sept. 5, 1967,
K 63,277
Int. Cl. B65d 51/16
U.S. Cl. 220—44                               2 Claims

ABSTRACT OF THE DISCLOSURE

A utensil is disclosed that can be placed over the top of a heating vessel such as a frying pan, cooking pot, casserole or the like which contains water from the food cooked therein and hot fat for frying the food. The utensil will prevent droplets of hot fat from being sprayed in the area surrounding the vessel while allowing the steam formed in the cooking vessel to be dispersed so the products being cooked in the heating vessel will be fried and not steamed. The utensil is made with apertures which are small enough to prevent fat droplets from escaping the vessel but large enough to allow the steam to escape.

---

The invention relates to a utensil for preventing spraying with frying pans, cooking pots or the like.

If, for the purpose of frying, some foodstuff having a water content is placed in a frying pan, cooking pot, casserole or the like that contains hot fat, the fat will spray out of the vessel in fine droplet form. This not only causes the surroundings to be soiled with fat but, quite apart from the fat that is lost, any person that is standing in the vicinity can suffer very painful burns. Indeed, these burns may not only be painful but could have dire consequences, for example if a drop of fat strikes the eye. One can take counter measures by placing a lid on the frying vessel. However, this has the disadvantage that saturated steam in then formed within the frying vessel and therefore the foodstuff in the vessel is steamed rather than fried and no crust will be formed thereon. Thus, if the foodstuff is really to be fried rather than steamed, one cannot counteract the abovementioned spraying of fat by providing the frying vessel with a lid.

The invention aims to provide a utensil with which one can prevent the sprays from frying vessels and the undesirable and dangerous consequences resulting therefrom without influencing the actual frying process, i.e., so that the foodstuff is properly fried rather than steamed despite use of the utensil according to the invention. The utensil is to be economical in manufacture and simple to use.

This aim is solved according to the invention by a planar apertured cover plate which can be placed over the mouth of the pan or pot and which is made from heat-resistant steamproof material, preferably metal.

The invention is based on the principle that a trap for the sprayed droplets of fat can be formed at the mouth of the frying vessel without influencing the actual frying process if this trap is so formed that it catches the sprayed droplets of fat but does not form a marked steam trap.

The cover plate could actually be any plate which is provided with holes or apertures over substantially all its area. According to a preferred embodiment of the invention, however, the cover plate consists of a wire mesh which is fixed in a rigid frame.

It has been shown that such a wire mesh on the one hand admirably fulfils the requirements of the cover plate and, on the other hand, permits very economical manufacture of the utensil according to the invention.

Other aims, features and advantages of the invention will be evident from the following description with reference to the accompanying drawings wherein:

FIG. 1 is a top view of a preferred embodiment of the utensil according to the invention;

FIG. 2 shows the FIG. 1 embodiment of the invention applied to a frying pan; and FIG. 3 is an enlarged sectional detail of the portion encircled at III in FIG. 2.

The embodiment of the utensil according to the invention illustrated in the drawings is generally designated with the numeral 10 and consists of a cover plate 12 that is perforated over its entire area and that is provided with a frame 14. In the illustrated version, the utensil 10 is circular because it is intended for use with a circular frying vessel, for example a pan 18 according to FIGS. 2 and 3. When the vessel for which the utensil according to the invention has been designed has a different shape, for example rectangular, the utensil 10 will be of corresponding shape. What is significant for the purpose of the invention is only that the actual cover plate 12 and frame 14 be sufficiently large to cover the mouth 22 of the vessel 18 (FIGS. 2 and 3).

In the illustrated example the cover plate 12 consists of a wire mesh 32. The frame 14 is of angle section sheet metal, of which one limb 24 is rolled outwardly about a strong wire 26, while the mesh 32 is secured to the underside of the other limb 28. Attachment of the mesh 32 to the limb 28 could, for example, be by way of spot welding.

The wire 26 extends around the frame 14 and laterally out of the frame 14 as indicated at 30 in FIG. 1. Beyond the confines of the frame 14 the wire 26 forms a loop that serves as a handle 16 for the utensil 10 according to the invention.

The pan 18 as indicated in chain-dotted lines in FIGS. 2 and 3 has a handle 20 and its upper rim 22 has a diameter somewhat smaller than that of the frame 14 of the utensil 10. The rim 22 is therefore disposed beneath the limb 28 of the angle section sheet metal 14. However, the same utensil 10 can be used for much smaller vessels. Consequently, a single utensil 10 according to the invention and having a comparatively large diameter can be used for frying vessels of various sizes.

The utensil of the invention is used in the following manner. If, for example, one wishes to fry an article in the pan 18, said article is placed in the conventional way in the pan that is standing over the source of heat and the utensil 10 is placed over the rim or mouth 22 of the pan. The fat that is sprayed upwardly during frying and also any water that is sprayed up, for example when frying a sausage, will now be caught by the cover plate 12 in the form of the wire mesh 32 and thus the surroundings will not be soiled and there is no danger of injury to any person in the vicinity.

The perforations or apertures in the cover plate 12, i.e., the mesh of the wire mesh 32 in the illustrated example, are dimensioned such that they practically completely catch the upwardly sprayed fat and water, but do not form a steam trap, so that the steam formed within the frying vessel 18 can escape through the cover plate 12.

In selecting the cover plate 12, i.e., when for example choosing the wire mesh 32 to be used for the cover plate 12, two optimum values are basically aimed at. If the vessel 18 were to be provided with a conventional lid, no fat and water would spray out of the vessel but the saturation of the steam in the vessel would bo so high that the article in the vessel would be steamed instead of fried. On the other hand, if one were to leave the vessel without any cover whatsoever, then the steam content therein would be a minimum but the fat or water could spray out without hindrance. The apertured cover plate is dimensioned such that the steam content within the vessel remains as small as possible but practically no fat or water can spray out of the vessel 18. After experimenting with different mesh sizes it is believed that best results can be obtained by wire mesh 32 having a mesh width of about 0.44 mm. and a diameter of about 0.21 mm. for the individual wires of the mesh. Simple arithmetic will show that this will provide about three fourths of the mesh area being closed, with the other one fourth open.

Of course, the invention is not restricted to the use of a wire mesh 32 for the cover plate 12. The cover plate 12 could also be made of any other material, for example sheet metal, which is so perforated that as little steam as possible accumulates within the vessel 18 in accordance with the above explanations while practically no fat or water can be sprayed out of the vessel.

Another advantage of the utensil according to the invention arises out of the fact that the cover plate 12 provides a certain amount of heat reflection. For example, if one were to fry a piece of liver in a conventional open frying vessel, it can be determined that the temperature at the top of the liver is about 60° C. By placing the utensil 10 according to the invention thereover, heat reflection is obtained which, with the above-mentioned numerical example, leads to an increase in the temperature at the surface of the liver, for example to about 90° C. The utensil according to the invention thus gives rise to additional surface heat during the frying process which is radiated upwardly through open frying vessels and thus not used in cooking.

The utensil according to the invention can be galvanized or provided with some other heat-resistant protective coating to give it an attractive appearance and protect it against corrosion and rust.

The invention is not, of course, restricted to details of the illustrated embodiment. It has already been stated that the circular form of the utensil according to the invention is intended preferably for round frying vessels. One can, however, use a circular utensil, for example, for rectangular frying vessels if the area of the cover plate 12 is sufficiently large to cover substantially all of the mouth of the vessel in question. Obviously, the frame 14 of the utensil according to the invention could be differently constructed, although the illustrated construction has proved particularly suitable for the stated purpose.

I claim:
1. A utensil for preventing hot droplets of fat from being sprayed from the mouth of a plurality of different size frying vessels while allowing steam to escape therefrom comprising:
 a flat cover plate adapted to lay over the mouth of a frying vessel and having a larger cross-sectional area than the mouth of the frying vessel, said flat cover plate including planar mesh wire located in a single plane and having a plurality of apertures, said apertures being of a size sufficiently small to trap fat droplets from leaving the vessel and sufficiently large to allow steam to escape from the vessel through said apertures, a circular rigid frame securing said wire mesh, said rigid frame having a first solid limb extending in said single plane toward the center of said cover plate, a second limb extending from said frame away from said wire mesh and said planar wire mesh secured to said first limb in the same plane as said first limb, said second limb curved to form a loop and a wire passing through said loop and positioned outside said frame to form a handle therefore.

2. A utensil according to claim 1 wherein said wire mesh is made of wires with a mesh width of approximately .44 mm. and a thickness of approximately .21 mm.

References Cited

UNITED STATES PATENTS

| | | | |
|---|---|---|---|
| 2,002,237 | 5/1935 | Roland | 220—44 |
| 2,348,452 | 5/1944 | Christopher | 220—44 X |
| 2,498,534 | 2/1950 | Drum | 220—24 |
| 2,770,389 | 11/1956 | Drakoff | 220—44 |

GEORGE E. LOWRANCE, *Primary Examiner.*